(12) United States Patent
Duenninger et al.

(10) Patent No.: US 9,793,069 B2
(45) Date of Patent: Oct. 17, 2017

(54) OPERATING DEVICE WITH OPTICAL FINGER NAVIGATION MODULE FOR A STEERING WHEEL

(71) Applicant: Daimler AG, Stuttgart (DE)

(72) Inventors: Johannes Duenninger, Wittershausen (DE); Volker Entenmann, Affalterbach (DE); Joerg Reisinger, Loechgau (DE); Florian Steinert, Bad Bocklet-Steinach (DE); Joachim Wuest, Hohenroth (DE)

(73) Assignee: Daimler AG, Stuttgart (DE)

( * ) Notice: Subject to any disclaimer, the term of this patent is extended or adjusted under 35 U.S.C. 154(b) by 132 days.

(21) Appl. No.: 14/765,290

(22) PCT Filed: Jan. 18, 2014

(86) PCT No.: PCT/EP2014/000133
§ 371 (c)(1),
(2) Date: Jul. 31, 2015

(87) PCT Pub. No.: WO2014/117918
PCT Pub. Date: Aug. 7, 2014

(65) Prior Publication Data
US 2015/0371794 A1 Dec. 24, 2015

(30) Foreign Application Priority Data
Feb. 2, 2013 (DE) .................. 10 2013 001 876

(51) Int. Cl.
*G06F 3/02* (2006.01)
*H01H 9/00* (2006.01)
(Continued)

(52) U.S. Cl.
CPC ........... *H01H 13/023* (2013.01); *B60K 35/00* (2013.01); *B60K 37/06* (2013.01); *B60Q 3/283* (2017.02);
(Continued)

(58) Field of Classification Search
CPC .................. G06F 3/0428; B60K 37/06; B60K 2350/1012; B60K 2350/1036;
(Continued)

(56) References Cited

U.S. PATENT DOCUMENTS 4,131,772 A * 12/1978 Weckenmann ....... B60S 1/0807
200/600
4,374,310 A * 2/1983 Kato ..................... B60Q 5/003
200/61.54
(Continued)

FOREIGN PATENT DOCUMENTS

EP 1 530 227 A1 5/2005
EP 2 369 818 A1 9/2011
(Continued)

OTHER PUBLICATIONS

PCT/EP2014/000133, International Search Report (PCT/ISA/220 and PCT/ISA/210) dated Apr. 15, 2014, with partial English translation, enclosing Written Opinion of the International Searching Authority (PCT/ISA/237) (Fifteen (15) pages).

*Primary Examiner* — Michael J Eurice
(74) *Attorney, Agent, or Firm* — Crowell & Moring LLP

(57) ABSTRACT

An operating device having an optical finger navigation module for installation in a steering wheel of a motor vehicle, which allows for secure operation and can be produced at low cost, is disclosed. The operating device has a mounting frame, in which a first light guiding element and the optical finger navigation module is held by a light sealing element. The light sealing element is mounted by a snap connection on the mounting frame. The mounting frame has at least one guide element with which a movement of the mounting frame can be guided.

10 Claims, 3 Drawing Sheets

(51) Int. Cl.

| | | |
|---|---|---|
| *H01H 13/02* | (2006.01) | |
| *H01H 13/10* | (2006.01) | |
| *H01H 9/02* | (2006.01) | |
| *B60K 35/00* | (2006.01) | |
| *B60K 37/06* | (2006.01) | |
| *G06F 3/0354* | (2013.01) | |
| *B62D 1/04* | (2006.01) | |
| *G06F 1/16* | (2006.01) | |
| *B60Q 3/64* | (2017.01) | |
| *B60Q 3/283* | (2017.01) | |
| *G06F 3/042* | (2006.01) | |
| *G05G 1/10* | (2006.01) | |

(52) U.S. Cl.
CPC .............. *B60Q 3/64* (2017.02); *B62D 1/046* (2013.01); *G06F 1/16* (2013.01); *G06F 3/03547* (2013.01); *G06F 3/042* (2013.01); *H01H 13/10* (2013.01); *B60K 2350/1012* (2013.01); *B60K 2350/1024* (2013.01); *B60K 2350/1036* (2013.01); *B60K 2350/203* (2013.01); *B60K 2350/928* (2013.01); *G05G 1/105* (2013.01); *G06F 3/0428* (2013.01); *H01H 2219/0622* (2013.01); *H01H 2221/024* (2013.01); *H01H 2233/07* (2013.01); *H01H 2237/006* (2013.01)

(58) Field of Classification Search
CPC ...... B60K 2350/928; B60K 2350/1024; H01H 13/10; H01H 13/14; H01H 2221/044; H01H 2233/07; H01H 2237/006; G05G 1/105

See application file for complete search history.

(56) References Cited

U.S. PATENT DOCUMENTS

| | | | | |
|---|---|---|---|---|
| 4,616,224 A | * | 10/1986 | Reighard | B60K 35/00 307/10.1 |
| 4,811,175 A | * | 3/1989 | DeSmet | H01H 13/702 200/313 |
| 5,631,454 A | * | 5/1997 | Hubacher | B60K 37/06 200/296 |
| 6,334,688 B1 | * | 1/2002 | Niwa | G05G 1/105 362/23.01 |
| 6,693,552 B1 | * | 2/2004 | Herzig | H01H 9/0214 340/13.32 |
| 6,791,046 B1 | * | 9/2004 | King | H01H 9/08 174/520 |
| 7,072,533 B1 | * | 7/2006 | Krier | G02B 6/0006 345/173 |
| 2001/0038381 A1 | * | 11/2001 | Griencewic | G06F 1/1616 345/163 |
| 2002/0030668 A1 | * | 3/2002 | Hoshino | G06F 3/0338 345/175 |
| 2003/0112160 A1 | * | 6/2003 | Hsiung | G05G 1/105 341/31 |
| 2005/0098416 A1 | * | 5/2005 | Kato | H01H 13/70 200/61.54 |
| 2005/0139458 A1 | * | 6/2005 | Komatsu | H01H 25/041 200/5 R |
| 2005/0168966 A1 | * | 8/2005 | Maeda | H01H 25/041 362/23.05 |
| 2006/0082549 A1 | * | 4/2006 | Hoshino | G06F 3/0421 345/157 |
| 2007/0047215 A1 | * | 3/2007 | Egami | G09F 19/12 362/23.15 |
| 2007/0206391 A1 | * | 9/2007 | Matsuo | G02B 6/0001 362/558 |
| 2007/0296701 A1 | * | 12/2007 | Pope | G06F 1/3215 345/168 |
| 2009/0127079 A1 | * | 5/2009 | Muramatsu | B60K 20/06 200/61.54 |
| 2009/0308719 A1 | * | 12/2009 | Hamada | H01H 9/18 200/4 |
| 2011/0132735 A1 | * | 6/2011 | Iordache | H01H 13/83 200/314 |
| 2012/0267222 A1 | * | 10/2012 | Gohng | G06F 3/016 200/61.54 |
| 2013/0048857 A1 | * | 2/2013 | Hasselbrinck | B60K 37/06 250/338.1 |
| 2013/0058122 A1 | * | 3/2013 | Hsiung | G03B 21/208 362/551 |
| 2013/0106706 A1 | * | 5/2013 | Meierling | H01H 13/83 345/170 |
| 2014/0267166 A1 | * | 9/2014 | Griffiths | G06F 3/0421 345/175 |
| 2015/0047958 A1 | * | 2/2015 | Chiba | B29C 45/16 200/314 |
| 2015/0362658 A1 | * | 12/2015 | Lee | H01H 13/83 362/23.05 |

FOREIGN PATENT DOCUMENTS

| | | |
|---|---|---|
| EP | 2 518 592 A2 | 10/2012 |
| JP | 2012-208762 A | 10/2012 |
| WO | WO 2011/131364 A1 | 10/2011 |

\* cited by examiner

OPERATING DEVICE WITH OPTICAL FINGER NAVIGATION MODULE FOR A STEERING WHEEL

BACKGROUND AND SUMMARY OF THE INVENTION

The present invention concerns an operating device for installation in a steering wheel of a motor vehicle with a mounting frame and an optical finger navigation module.

From the publication EP 2 369 818 A1, an optical finger navigation module for a mobile telephone is known. It is surrounded by an annular illuminated area and possesses a chrome-like ring for better orientation for the user.

An optical finger navigation module (OFN) can be integrated as a sensor for the detection of finger movements in the switch block of a motor vehicle steering wheel. Control signals obtained from this can be used for example to control a display menu in the motor vehicle. In many cases, this kind of OFN can also be embodied as a button or push switch, and therefore can be activated at right angles to the operating area (switch panel).

For better orientation, it is advantageous if the finger navigation module has an illumination. An annular illumination has proven to be expedient to this end. In a qualitatively high-value embodiment, the annular illumination should be homogeneous and be available in various embodiments. A further requirement regarding practicability when using the vehicle steering wheel is that the OFN used as a button or switch should have activation haptics comparable to that of a short-stroke button. Furthermore, it is desirable if the operating area of the OFN has a close-tolerance overlap to the surrounding switch panel. Moreover, the movements of the OFN should not result in deterioration of the contacts of the OFN to the printed circuit board. It would be desirable, furthermore, if the fixing of the OFN could be carried out without gluing.

In so-called "consumer electronics" today, OFN 1 is used, as is shown in the plan view of FIG. 1 and the side view of FIG. 2. This kind of OFN 1 has a quadratic operating area 2, for example. This is surrounded by an illumination ring 3, the surface of which is flush with that of the operating area. The illumination ring 3 is therefore integrated into the OFN 1. It is applied e.g. by means of PVD (physical vapor deposition), so that it functions like a chrome surface in the unilluminated state during the day. At night time the illumination ring 3 is illuminated.

A snap disk 4 is glued on the module underside of the OFN 1. It functions as a button element. The integration of the illumination ring 3 and the snap disk 4 into the OFN 1 is motivated by the desire in consumer electronics for minimal construction depth. However, this embodiment has numerous disadvantages, which oppose the use of this kind of OFN 1 in a motor vehicle steering wheel.

Due to the small construction depth, the integrated ring illumination cannot be embodied homogeneously, as the gap from the illuminating LED to the surface to be illuminated is too small. The difference in brightness inside the ring illumination amounts to up to 50 percent, which is not enough for the quality requirements in a vehicle.

Due to the integration of the illumination, the OFN in the area to be illuminated additionally needs to have a translucent surface, which is not yet suitable for automotive use according to the current prior art. For example, this surface cannot withstand the temperatures and humidities that are normal in the automotive sector.

A third disadvantage is that color variations in the illumination always lead to a change in the OFN itself. This opposes the desire, which is conventional in the automotive sector, to differentiate different vehicle classes and equipment lines from each other using a variation of illumination colors and the use of decorative elements, while at the same time using technical components that are as unchanged as possible.

With the snap disk glued on, the operating forces and paths necessary for using the vehicle cannot be shown. In order to avoid unintended operation in all driving situations, and to avoid vibrations that could thereby possibly arise, in the vehicle the operating forces must be higher, and the operating paths longer, than in consumer electronics. This in turn necessitates good guiding of the OFN, which is not possible using the low construction depths in consumer electronics.

The object of the present invention therefore consists in providing an operating device with an optical finger navigation module for installation in a steering wheel of a motor vehicle, which meets the requirements in vehicle construction.

An operating device for installation in a steering wheel of a motor vehicle with a mounting frame and an optical finger navigation module is therefore provided. In the mounting frame, a first light guiding element and the optical finger navigation module are held by a light sealing element. The light sealing element is fastened by means of a snap connection to the mounting frame, and the mounting frame has at least one guide element, with which a movement of the mounting frame can be guided.

Advantageously, therefore, a mounting frame and a light sealing element are mounted to each other almost as housing by a snap connection, and the optical finger navigation module and a light guiding element is thereby held in their interior. The light sealing element therefore has an additional holding function, as is typical for a housing. Furthermore, the mounting frame also has a guide element, on which the operating device can be guided when moving. With this, the mounting frame also has the function of movement guiding, alongside its holding function.

A second light guiding element is preferably inserted between the optical finger navigation module (OFN) and the light sealing element. This has the advantage that the first light guiding element can be optimized with regard to light distribution, while the second light guiding element can be optimized with regard to the color, for example, and can be kept easy to change.

The first light guiding element and the second light guiding element can each be designed in the shape of a ring and can surround the optical finger navigation module. Using a ring illumination made possible by this, the user of the operating device can orient himself or herself optically, and locate the operating area of the optical finger navigation module more easily.

It is furthermore advantageous if a rubber-elastic element is arranged between the optical finger navigation module and the mounting frame. This element, also known as a soft component, can also serve both the tolerance equilibrium and the strain relief of the elastic connections of the OFN.

Specifically, the rubber-elastic element can press an electric conductor, in particular a foil conductor, of the optical finger navigation module to the strain relief on the first light guiding element. To this end, the rubber-elastic element can be designed to be disk-shaped and appropriately contoured.

Specifically, a contactor can be prepared for mounting in a steering wheel having an operating device described above and at least one further operating device. In this way switch blocks, such as are conventional in modern steering wheels, can be implemented having the operating device according to the invention.

The contactor can be equipped with a housing, in which the operating devices are installed and which has a guide element corresponding to the guide element of the mounting frame, for guiding the mounting frame in the housing. In this way a closed module can be prepared, which can be installed in a steering wheel in a few steps.

Furthermore, at least one light source can be arranged in the housing, the light from which is guided over the first and second light guiding element onto the surface of the operating device. In this way, the operating device itself is therefore free from light sources, and it is nevertheless illuminated on its surface.

Furthermore, a switch tower of a switch is arranged on the side of the mounting frame facing away from the optical finger navigation module, which can be activated by moving the mounting frame. In this way, the operating device having the optical finger navigation module can be used at the same time as an activation element for a switch.

In a further embodiment, a safety mat is arranged on the side of the mounting frame facing away from the optical finger navigation module, which presses the conductor of the optical finger navigation module to the strain relief against a section of the housing. In this way the safety mat, which is typically made of an elastic material (e.g. silicon), additionally takes on the function of a strain relief.

The present invention is now described in greater detail by means of the attached drawings.

DETAILED DESCRIPTION OF THE DRAWINGS

The exemplary embodiments described in more detail below represent preferred embodiments of the present invention.

Figure 1:
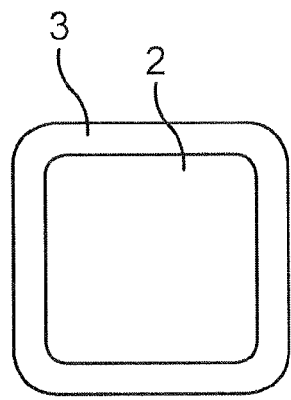
FIG. 1 is a plan view of an OFN module according to the prior art.
Figure 2:
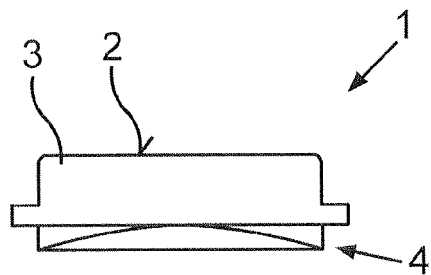
FIG. 2 is a side view of the OFN module of FIG. 1.
Figure 3:
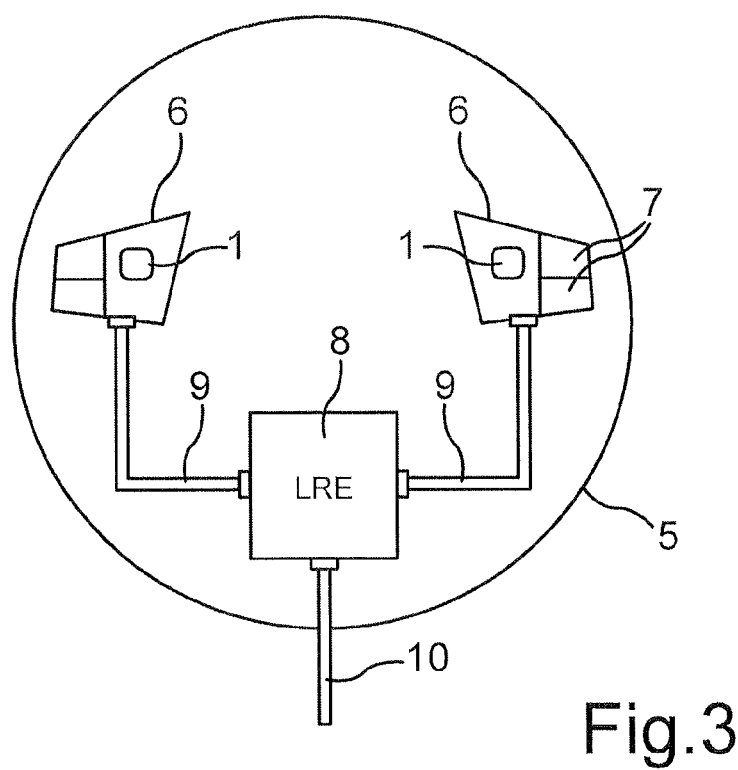
FIG. 3 is a sketch of a steering wheel with two OFN modules.

A steering wheel 5 is schematically represented in FIG. 3. There are two switch blocks 6 located here on the steering wheel in ergonomically suitable positions, which can also be labelled as multi-functional switches (MFS). In other exemplary embodiments only one such switch block is provided, or more than two switch blocks or multi-functional switches are provided.

In the example of FIG. 3, each switch block 6 has an optical finger navigation module 1 (OFN). Furthermore, the switch blocks 6 each have several mechanical operating elements 7. A cable 9, which is equipped with sockets at its ends, facilitates the transmission of data from the left switch block 6 to a steering wheel electronic system 8 (LRE). Analogously to this, communication from the right switch block 6 to the steering wheel electronic system 8 is carried out via a further cable 9. The signal output from the steering wheel electronic system 8 to, for example, a jacket pipe switch module (not shown in FIG. 3) is carried out via an additional cable 10.

As has already been mentioned, each OFN 6 serves as a sensor for the detection of finger movements. The cables 9 serve to implement a databus connection or communication device between the OFN modules 1 and the steering wheel electronic system 8.

The OFN 1 should be combined, for example, with a button or switch and furthermore, as mentioned, meet the following requirements:
homogeneous annular illumination in different embodiments
comparable activation haptics to a short-stroke button
close-tolerance overlap of the OFN to the surrounding switch panel
non-wearing contact of the OFN to the printed circuit board and fixing of the OFN without glue.

Figure 4:
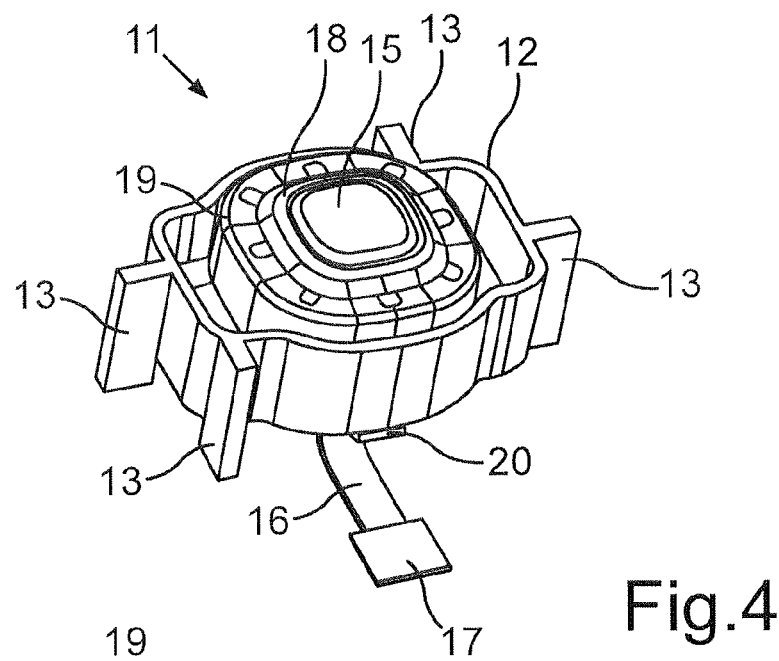
FIG. 4 is an operating device according to the invention in the assembled state.

The centerpiece of the fulfillment of these requirements is the operating device 11 described in connection with FIGS. 4 and 5, which can also be called an OFN assembly. As can be seen in FIG. 4, the operating device 11 has a mounting frame 12 as a supporting base element. This is manufactured as a plastic injection molded part, for example. Here, it has four fins 13, formed as one piece, as guide elements. Each of these fins 13 sticks out in a different direction from the mounting frame 12.

Figure 5:
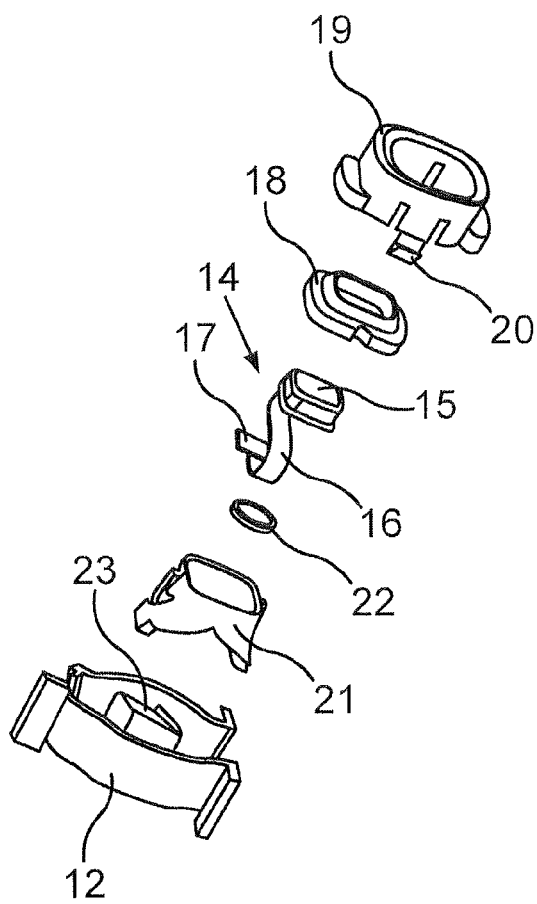
FIG. 5 is an exploded view of the operating device from FIG. 4.

Inside the mounting frame 12 there is the OFN module 14 (see FIG. 5), of which only the operating area 15, a foil conductor 16 and a socket 17 at its end can be seen in FIG. 5. The foil conductor 16 including socket 17 serves for the electrical connection of the OFN module 14.

In the installed state, the operating area 15 of the OFN module (in short OFN 14) is surrounded by an annular light conductor 18. This annular light conductor 18 can be produced in a desired color, so that the light emanating outwards through it has the corresponding coloring.

The annular light conductor 18 is in turn surrounded by a light sealing element 19 on its outer perimeter. The light sealing element 19 serves to limit the area of light emission of the annular light conductor 18 upwards. Furthermore, the light sealing element 19 has the function of forming a stopper for the annular light guide 18, which for its part forms a stop for the OFN 14. The OFN 14 and the annular light guide 18 are therefore held upwards, where the mounting frame 12 is open, by the light sealing element 19.

In FIG. 4 the end of a snap-fit 20 can also be recognized, which is formed in one piece with the light sealing element 19 and extends through the base of the mounting frame 12. This snap-fit 20 works together with the base of the mounting frame 12 in the sense of a snap connection. For assembly, the snap-fit 20 of the light sealing element 19 is pressed through a corresponding relief in the base of the mounting frame 12. There, it snaps in a conventional manner into its final position and thereby engages behind an edge of the mounting frame 12. Conversely, in an alternative embodiment the snap-fit can also be formed in one piece on the mounting frame 12 and enter into a snap connection with a corresponding element of the light sealing element 19.

As also emerges from FIG. 5, the OFN component or the operating device 11 additionally consists, alongside the mounting frame 12, the OFN 14, the ring conductor 18 and the light sealing element 19, of a lower light conductor 21 and a rubber-elastic element 22. The lower light conductor 21 (also called the first light guiding element in the present document) is inserted in the mounting frame 12 during assembly. One or more reliefs are provided in the base of the mounting frame 12, through which light penetrates into the lower light conductor 21. It transports the light to the annular light conductor 18. For this, it likewise has an annular form and a wall height that corresponds somewhat to that of the bowl-shaped mounting space 12. In principle, the lower light conductor (first light guiding element) and the annular light conductor 18 (second light guiding element) can also be formed in one piece.

As can be seen from FIG. 5, the mounting frame 12 has a support structure 23 in its interior. During installation the rubber-elastic element 22 is applied to this support structure, which is of similar height to the wall of the bowl-shaped mounting frame 12. The rubber-elastic element 22 is then surrounded by the ring-shaped lower light conductor 21 in the assembled state. The rubber-elastic element 22, i.e. the soft component, is preferably designed to be disk-shaped and has, as is described in connection with FIG. 7, specific contours if necessary, in order to also take over other functions alongside tolerance equilibrium, such as strain relief. In this way the rubber-elastic element 22 also protects the underside of the OFN 14 from damage.

Figure 6:
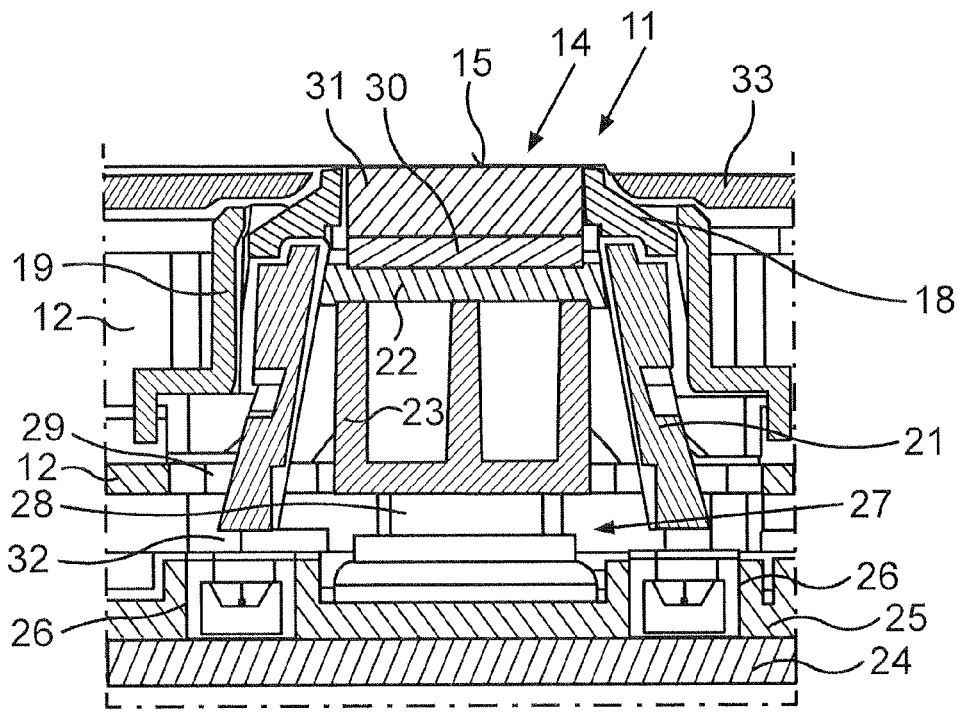
FIG. 6 is a cross-section through an operating device installed in a switch block.

FIG. 6 now shows the operating device 11 in a vertical section in the installed state in a contactor or a switch block.

On the housing base (not shown) of the contactor there is a printed circuit board 24. This carries two LEDs 26 shining upwards, embedded in a switch mat 25. Furthermore, a button or switch 27 is located on the printed circuit board 24. Directly over a switch tower 28 of the switch 27 there is the support structure 23 of the mounting frame 12. The conical, hollow lower light conductor 21 surrounds the support structure 23 and extends through reliefs 29 in the base 30 of the mounting frame 12 to the LEDs 26.

The disk-shaped rubber-elastic element 22 rests on the supporting structure. The rubber-elastic element 22 affixes the lower light conductor 21 if necessary. A printed circuit board 30 of the OFN 14 rests on the rubber-elastic element 22. On this there is the actual sensor section 31 of the OFN 14 with its operating area 15.

The sensor section 31 of the OFN 14 is surrounded on the exterior perimeter by the annular light conductor 18. The latter extends upwards to the operating area 15 and downwards to the lower light guiding element 21. In this way the light from the LEDs 26 is conducted upwards via the lower light conductor 21 to the annular light conductor 18 and there is guided to the surface of the operating device 11. A gap 32 between the lower end of the lower light conductor 21 and one of the LEDs 26 is thereby not damaging. This gap is necessary so that the operating device 11 including OFN 14 and mounting frame 12 can perform the necessary shifting of the switch 27. Guiding elements of the housing for guiding the fins 13 of the mounting frame 12 are not visible in FIG. 6.

The annular light conductor 18 and the lower light conductor 21 are surrounded on the outside by the likewise annular light-sealing element 19. It prevents light from beaming sideways outwards from the light conductors. Furthermore, it holds the whole OFN component together.

On the surface there is a switch panel 33, the surface of which is preferably at a somewhat lower level than the operating area 15 in the inactivated state of the operating device 11. In this way the driver can easily feel the operating device.

Figure 7:
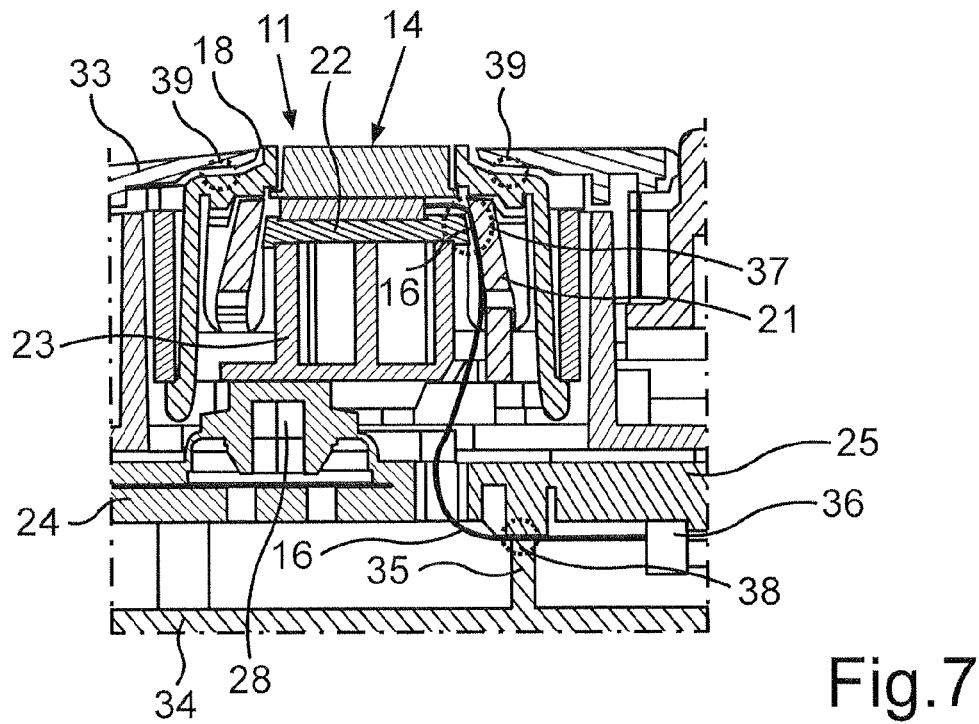
FIG. 7 is a cross-section through the installed operating device from FIG. 6, rotated through 90°.

In FIG. 7 the arrangement from FIG. 6 is shown in a section rotated through 90°. In this view, a housing base 34 of the contactor is also visible. A partition 35 sticks out at a right angle to the base. On the lower side of the printed circuit board 24 a plug 36 is inserted, which serves to connect the foil conductor 16 of the OFN 14. The foil conductor of the OFN 14, which produces the electrical connection between the OFN and the printed circuit board 24, must enable the relative movement of the operating device or the OFN 14 relative to the printed circuit board 24. For reasons of construction space, the foil conductor 16 must be rolled up strongly directly on the OFN 14 so that it can be guided downwards inside the component to the printed circuit board 24 and the plug 36 arranged there. In particular, the foil conductor 16 is guided on the inside of the lower light conductor 21 to the printed circuit board 24. It thereby runs through a relief in the printed circuit board 24 through it onto its lower side.

In order to avoid wearing of the foil conductor 16, in particular in the area of its ends or contact points, by the activation and movement of the whole OFN component, i.e. the operating device 11, movements of the foil conductor 16 on the exit of the OFN 14 and on the plug 36 on the printed circuit board 24 must be avoided. For this reason, an upper strain relief (implemented in the dashed circle 37) is implemented by the soft component, i.e. the rubber-elastic element 22, and a lower strain relief (see dashed circle 38) by the switch mat 25. In the upper strain relief 37, the rubber-elastic element 22 presses the foil conductor 16 against the inside of the lower light conductor 21. In the lower strain relief, the switch mat 25, which extends through the relief in the printed circuit board 24, presses the foil conductor 16 against the partition 35 of the housing of the MFS, i.e. the contactor. The switch mat 25 preferably made from an elastic silicon therefore has, alongside its actual function as a lining of the switch elements, the additional function of a strain relief.

The annular light conductor 18 resting on the OFN 14 in assembly is a decorative element around the OFN 14 that is visible for the user and illuminated. The annular light conductor 18 transports the light, as mentioned, from the lower light conductor 21 to the surface of the OFN component. At the same time, the annular light conductor 18 fixes the OFN 14 from above and forms the stop (dashed circle 39) of the OFN component on the panel 33 of the MFS (multi-functional switch), i.e. the contactor.

It is important for the operability of the OFN in the steering wheel 5 that there is a precisely-specified overlap of the OFN 14 relative to the panel 33 of the MFS. As it should be operated without looking at it, in contrast to consumer electronics, the driver must be able to feel the position of the OFN in the steering wheel. For this, a specific overlap of the OFN relative to the panel 33 is required, as has already been addressed in connection with FIG. 6. On the other side, the overlap may also not be so big, because otherwise the wiping movement of the finger over the OFN operating surface 15 is hindered. The overlap of the OFN 14 to the panel 33 is also determined alongside the target by the tolerances of the components that form the tolerance chain from OFN 14 up to the panel 33. In that the annular light conductor 18 is placed on the OFN 14 and at the same time forms the stop for the panel 33, the tolerance chain consists of only three parts: the OFN 14, the annular light conductor 18 and the panel 33. In this way the tolerance chain is as short as possible and the overlap of the OFN 14 to the panel 33 can be close-tolerance.

To summarize, the operating device according to the invention, with which the corresponding contactor can be produced, has (among others) the advantage that it can be installed using plugs and clips alone. A gluing process is therefore not necessary.

The ring conductor 18 is embodied as a separate element, and its surface and its coloration can be varied without repercussions on the other elements. For example, the annular light conductor can be embodied as a cost-efficient molded part without further surface treatment, or as a sophisticated decorative part in a translucent chrome look.

The illumination of the operating device is homogeneous due to the available run lengths of the light and the scattering effect of the light conductor. The lower light conductor is correspondingly formed geometrically for the implementation of the homogeneous light distribution. The light sources arranged on the printed circuit board can be changed without repercussions on the OFN, which represents an additional advantage.

It is furthermore advantageous that the tolerance chain determining the overlap of the OFN to the surrounding switch panel is very short. In this way the corresponding dimension, which is important for operability, can be close-tolerance.

A further advantage of the operating device is represented by the rubber-elastic element, which compensates for finishing tolerances and fixes the foil conductor of the OFN. In this way, in the upper area of the operating device at least, wearing on bending and contact positions of the foil conductor is eliminated. The lower strain relief of the foil conductor by the safety mat counts towards the most important advantages of the exemplary embodiment described above.

As the mounting frame has a suitable height (e.g. a few millimeters), in the direction of movement enough guidance of the operating device is possible, using which high-quality haptics can be achieved.

The invention claimed is:

1. An operating device for installation in a steering wheel of a motor vehicle, comprising:
   a mounting frame;
   an optical finger navigation module;
   a light sealing element disposed within the mounting frame;
   wherein the light sealing element is mounted by a snap connection in the mounting frame;
   wherein the mounting frame has a guide element, wherein a movement of the operating device in the steering wheel is guidable by the guide element;
   a first light guiding element; and
   a second light guiding element disposed between the optical finger navigation module and the light sealing element;
   wherein the first light guiding element and the optical finger navigation module are held by the light sealing element by means of the second light guiding element.

2. The operating device according to claim 1, wherein the first light guiding element and the second light guiding element are each ring shaped and surround the optical finger navigation module.

3. The operating device according to claim 1, wherein the light sealing element surrounds the second light guiding element and wherein the optical finger navigation module and the second light guiding element are held upward by the light sealing element.

4. The operating device according to claim 1, wherein a rubber-elastic element is disposed between the optical finger navigation module and the mounting frame.

5. The operating device according to claim 4, wherein the rubber-elastic element presses an electric conductor of the optical finger navigation module against the first light guiding element.

6. A contactor for installation in a steering wheel, comprising:
   an operating device according to claim 1.

7. The contactor according to claim 6, wherein on a side of the mounting frame facing away from the optical finger navigation module a switch tower of a switch is disposed which is activatable by the movement of the mounting frame.

8. The contactor according to claim 6, wherein the contactor has a housing, wherein the operating device is disposed in the housing, and wherein the mounting frame is guidable in the housing by the guide element.

9. The contactor according to claim 8, wherein in the housing a light source is disposed, and wherein light from the light source is conducted via the first and second light guiding elements onto a surface of the operating device.

10. The contactor according to claim 8, wherein on a side of the mounting frame facing away from the optical finger navigation module a safety mat is disposed which presses an electric conductor of the optical finger navigation module against a section of the housing.

* * * * *